(12) United States Patent
Koike

(10) Patent No.: US 12,339,501 B2
(45) Date of Patent: Jun. 24, 2025

(54) OPTICAL CONNECTION COMPONENT AND CONNECTOR ASSEMBLY

(71) Applicant: Fujikura Ltd., Tokyo (JP)

(72) Inventor: Yoshifumi Koike, Sakura (JP)

(73) Assignee: Fujikura Ltd., Tokyo (JP)

( * ) Notice: Subject to any disclaimer, the term of this patent is extended or adjusted under 35 U.S.C. 154(b) by 279 days.

(21) Appl. No.: 18/007,327

(22) PCT Filed: Aug. 6, 2021

(86) PCT No.: PCT/JP2021/029347
§ 371 (c)(1),
(2) Date: Jan. 30, 2023

(87) PCT Pub. No.: WO2022/137632
PCT Pub. Date: Jun. 30, 2022

(65) Prior Publication Data
US 2023/0273376 A1    Aug. 31, 2023

(30) Foreign Application Priority Data
Dec. 23, 2020   (JP) .................................. 2020-213940

(51) Int. Cl.
G02B 6/38    (2006.01)
G02B 6/32    (2006.01)

(52) U.S. Cl.
CPC ............ G02B 6/3885 (2013.01); G02B 6/32 (2013.01); G02B 6/327 (2013.01); G02B 6/3883 (2013.01)

(58) Field of Classification Search
CPC .......... G02B 6/32; G02B 6/325; G02B 6/327; G02B 6/3885
See application file for complete search history.

(56) References Cited

U.S. PATENT DOCUMENTS

| | | | |
|---|---|---|---|
| 6,078,708 A * | 6/2000 | de la Tocnay ....... | G02B 6/2848 385/33 |
| 2002/0097957 A1* | 7/2002 | Kikuchi ................ | G02B 6/327 385/33 |

(Continued)

FOREIGN PATENT DOCUMENTS

| | | |
|---|---|---|
| JP | 2011-075978 A | 4/2011 |
| JP | 6554891 B2 | 8/2019 |

(Continued)

OTHER PUBLICATIONS

International Search Report issued in corresponding International Application No. PCT/JP2021/029347 mailed Oct. 26, 2021 (2 pages).

*Primary Examiner* — Michael Stahl
(74) *Attorney, Agent, or Firm* — Osha Bergman Watanabe & Burton LLP

(57) ABSTRACT

An optical connection component includes: an input end that separates each of light beams output from an output end surface of a multi-core fiber toward single-core fibers, and enlarges each beam diameter of the light beams; and an output end that allows the light beams from the input end to be parallel to an axial direction of the multi-core fiber. The optical connection component guides the light beams output from the output end surface, inclined with respect to a plane perpendicular to the axial direction, to the single-core fibers, wherein the light beams output from the output end surface propagate in a direction inclined with respect to the axial direction.

7 Claims, 9 Drawing Sheets

(56) References Cited

U.S. PATENT DOCUMENTS

| | | | |
|---|---|---|---|
| 2010/0238559 A1* | 9/2010 | Tanaka | G02B 6/327 |
| | | | 359/811 |
| 2011/0228404 A1 | 9/2011 | Webb et al. | |
| 2012/0328238 A1* | 12/2012 | Inoue | G02B 6/32 |
| | | | 385/33 |
| 2015/0253507 A1* | 9/2015 | Hara | G02B 1/11 |
| | | | 385/14 |
| 2022/0050250 A1* | 2/2022 | Asada | G02B 6/04 |
| 2023/0228950 A1* | 7/2023 | Shimakawa | G02B 6/32 |
| | | | 385/74 |

FOREIGN PATENT DOCUMENTS

| | | |
|---|---|---|
| WO | 2014/168040 A1 | 10/2014 |
| WO | 2018/221717 A1 | 12/2018 |
| WO | 2020/137070 A1 | 7/2020 |

* cited by examiner

OPTICAL CONNECTION COMPONENT AND CONNECTOR ASSEMBLY

BACKGROUND

Technical Field

The present invention relates to an optical connection component and a connector assembly.

Description of the Related Art

Patent Document 1 discloses an optical connector including two optical systems (optical connection components) provided between a multi-core fiber and a plurality of single-core fibers. The two optical systems individually optically couple a plurality of cores of the multi-core fiber and cores of the plurality of single-core fibers.

In the optical connector of Patent Document 1, in order to reduce the possibility that a reflected return light beam may be generated between an end surface of the multi-core fiber and an end surface of the single-core fiber, the end surfaces optically connect the multi-core fiber and the single-core fiber which are inclined with respect to a plane perpendicular to axial directions of the multi-core fiber and the single-core fiber.

PATENT DOCUMENT

Patent Document 1: Japanese Patent No. 6554891

However, in the optical connector of Patent Document 1, between the two optical systems or between the optical system and the end surface of the single-core fiber, while being parallel to each other, a plurality of light beams are inclined with respect to the axial directions of the fibers (the multi-core fiber and the single-core fiber). Therefore, in order to optically couple the multi-core fiber and the single-core fiber by using the two optical systems, it is necessary to highly accurately position the two optical systems. In particular, when the positions of the optical systems slightly deviate in the axial direction and in a direction perpendicular thereto, an optical coupling rate between the multi-core fiber and the single-core fiber is significantly degraded. That is, the multi-core fiber and the plurality of single-core fibers cannot be easily coupled.

SUMMARY

One or more embodiments may provide an optical connection component and a connector assembly including the optical connection component, which are capable of easily and optically coupling a multi-core fiber and a plurality of single-core fibers even when an end surface of the multi-core fiber or the single-core fiber is inclined.

According to one or more embodiments, there is provided an optical connection component for guiding a plurality of light beams output from an output end surface of a multi-core fiber to a plurality of single-core fibers. The optical connection component includes an input end configured such that the plurality of light beams output from the output end surface are separated from each other toward the plurality of single-core fibers, and each beam diameter of the plurality of light beams is enlarged, and an output end configured such that the plurality of light beams passing through the input end and directed toward the plurality of single-core fibers are parallel to an axial direction of the multi-core fiber. The output end surface of the multi-core fiber is inclined with respect to a plane perpendicular to the axial direction of the multi-core fiber. The plurality of light beams output from the output end surface propagate in a direction inclined with respect to the axial direction of the multi-core fiber.

In the optical connection component described above, the beam diameters of the plurality of light beams output from the output end are enlarged. Therefore, in order to guide the plurality of light beams output from the output end of the optical connection component to the plurality of single-core fibers, another optical connection component (second optical connection component) may be provided between the output end of the optical connection component and input end surfaces of the plurality of single-core fibers. The second optical connection component is configured to collect each of the plurality of light beams output from the output end of the optical connection component (to reduce the beam diameter to coincide with a mode field diameter of the single-core fiber), and to cause the light beam to enter the plurality of single-core fibers.

In the optical connection component described above, each of the plurality of light beams output from the output end is parallel to the axial direction. In addition, the beam diameters of the plurality of light beams output from the output end are enlarged. Therefore, even when accuracy in relative positioning between the optical connection component and the second optical connection component is low, the multi-core fiber and the plurality of single-core fibers can be easily and optically coupled.

In the above-described optical connection component, a central axis of the input end may be parallel to the axial direction, and an intersection between the output end and the central axis of the output end may deviate from the central axis of the input end in a direction orthogonal to the axial direction.

In the above-described optical connection component, a central axis of the input end may be parallel to the axial direction, and a central axis of the output end may be inclined with respect to the central axis of the input end around an intersection between the output end and the central axis of the output end.

According to one or more embodiments, there is provided a connector assembly including a first ferrule is configured to hold an end portion of a multi-core fiber and has a first exposed surface through which an output end surface of the multi-core fiber inclined with respect to a plane perpendicular to an axial direction of the multi-core fiber is exposed, a second ferrule is configured to hold end portions of a plurality of single-core fibers and has a second exposed surface through which each input end surface of the plurality of single-core fibers inclined with respect to a plane perpendicular to an axial direction of the single-core fiber is exposed, the optical connection component arranged between the first exposed surface and the second exposed surface, and a second optical connection component arranged between the optical connection component and the second exposed surface. The optical connection component is arranged such that the input end faces the first exposed surface. The second optical connection component collects each of the plurality of light beams output from the output end of the optical connection component, and causes the light beam to enter the plurality of single-core fibers.

According to one or more embodiments, even when the output end surface of the multi-core fiber or the input end surface of the single-core fiber is inclined, the multi-core fiber and the plurality of single-core fibers can be easily and optically coupled.

DESCRIPTION OF THE EMBODIMENTS

First Example

Hereinafter, a first example of one or more embodiments will be described with reference to FIGS. 1 to 5.

Figure 1:
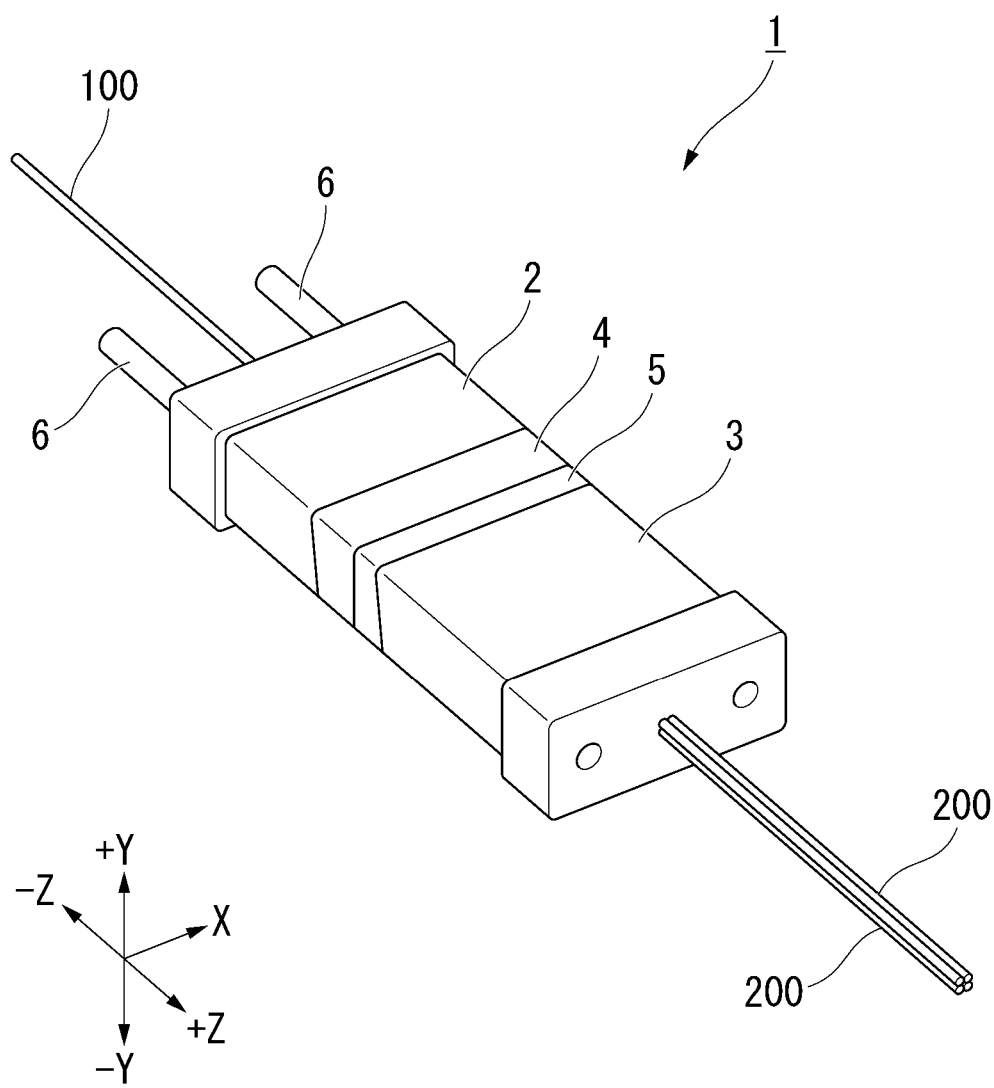
FIG. 1 is a perspective view of a connector assembly according to one or more embodiments.
Figure 2:
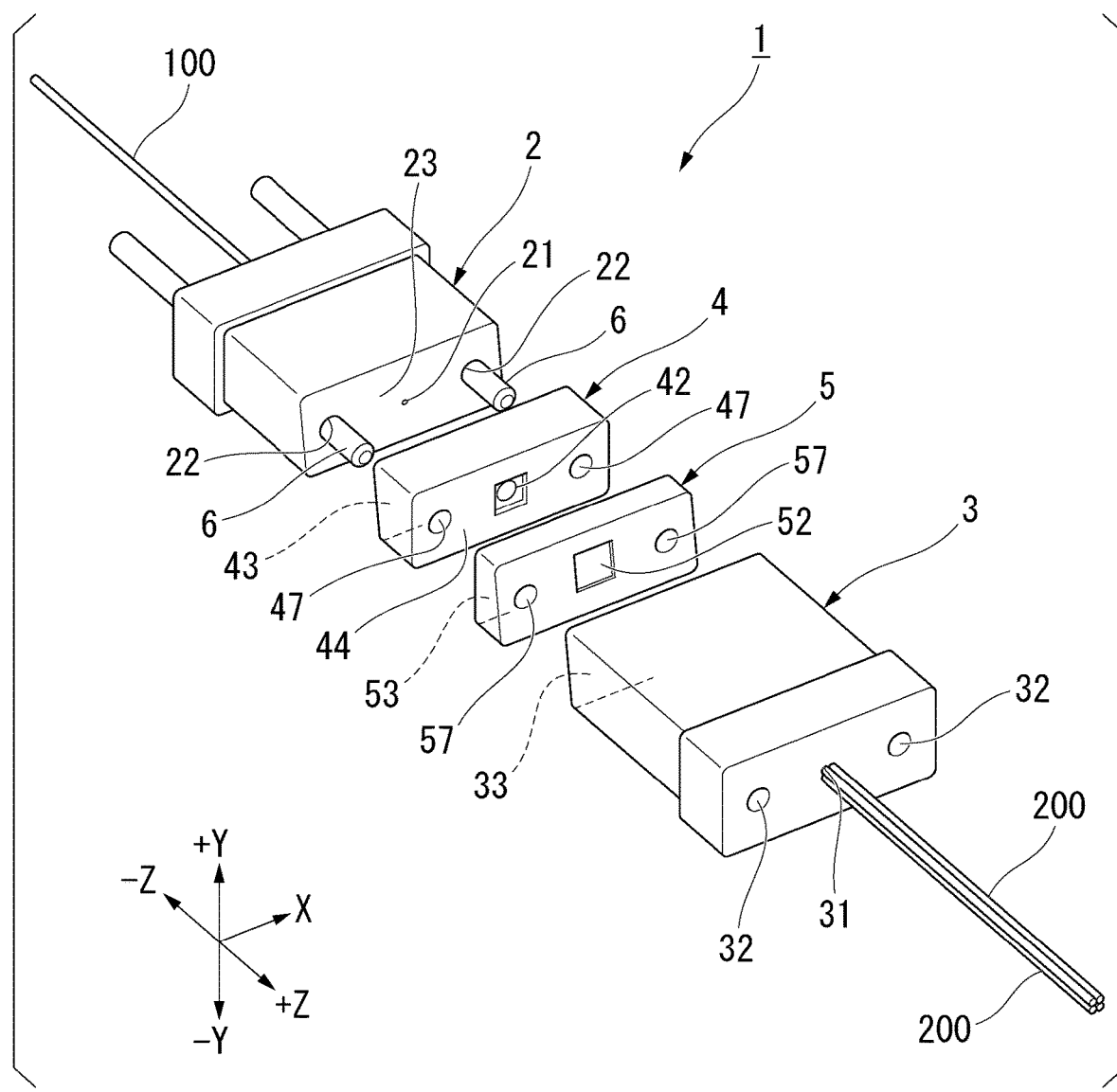
FIG. 2 is an exploded perspective view of the connector assembly in FIG. 1.

As shown in FIGS. 1 and 2, a connector assembly 1 of a first example is a structure for optically coupling a multi-core fiber 100 and a plurality of single-core fibers 200.

Figure 3:
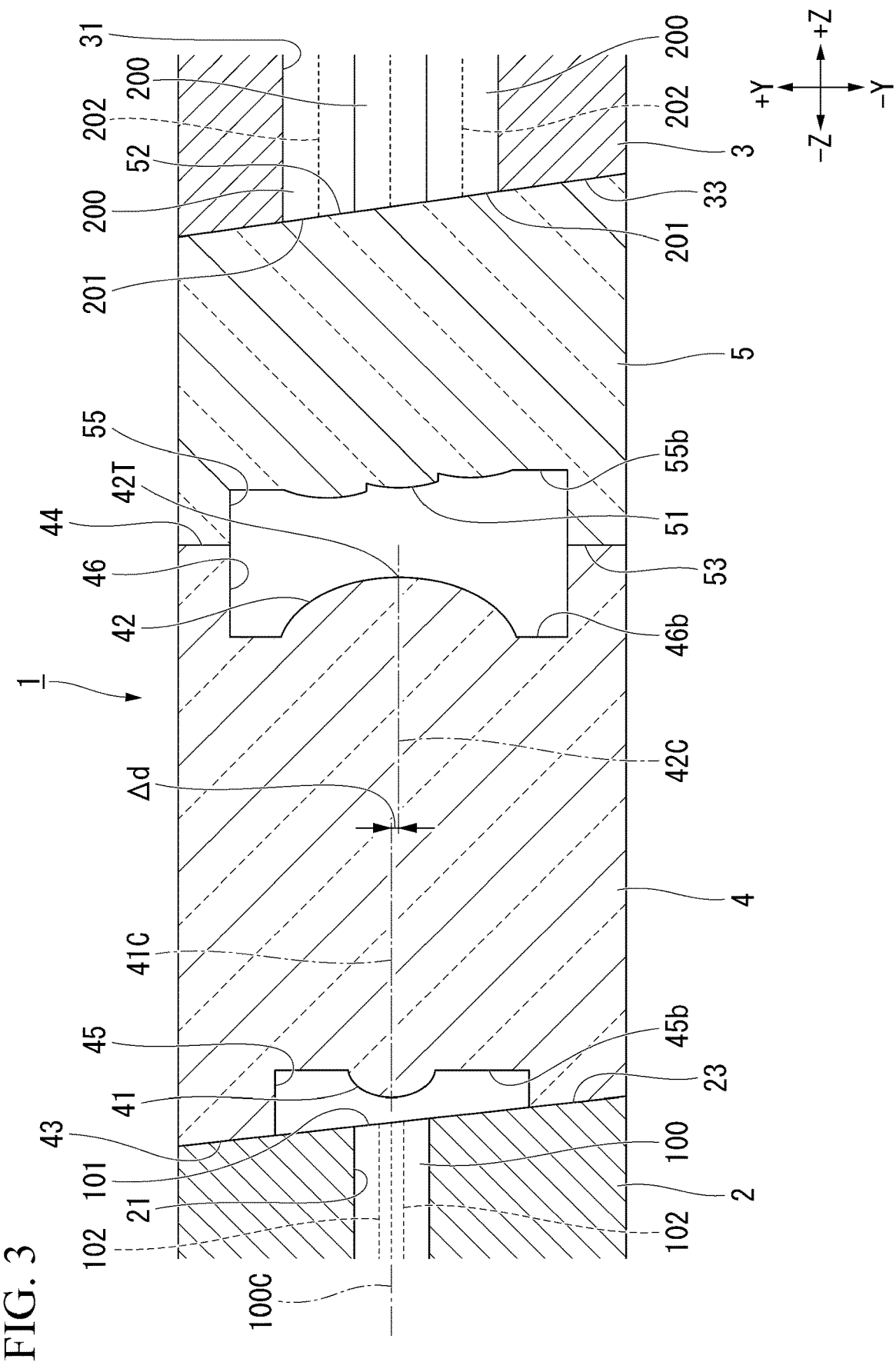
FIG. 3 is a sectional view of the connector assembly in FIG. 1.
Figure 4:
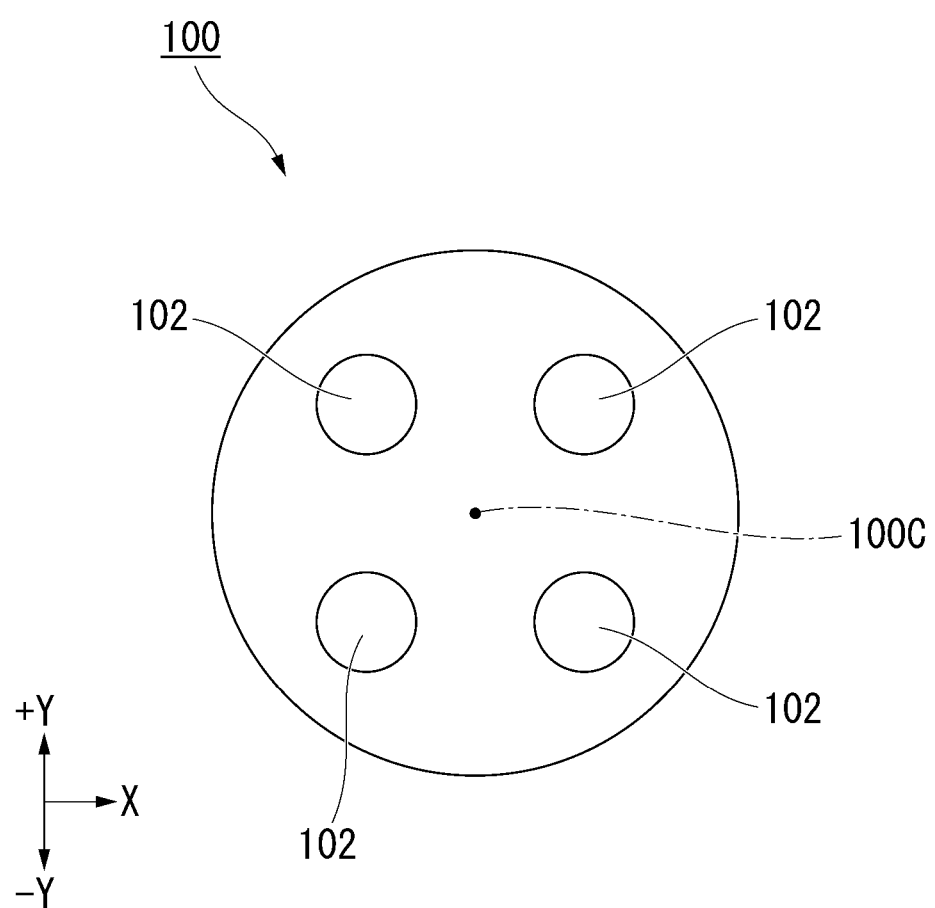
FIG. 4 is a diagram schematically showing a cross section of a multi-core fiber in the connector assembly in FIGS. 1 to 3.

As shown in FIGS. 3 and 4, the multi-core fiber 100 is an optical fiber having a plurality of cores 102. The plurality of cores 102 may be arranged at rotationally symmetrical positions around an axis 100C of the multi-core fiber 100. The multi-core fiber 100 of one or more embodiments has four cores 102. The four cores 102 are aligned at an equal interval in a circumferential direction around the axis 100C of the multi-core fiber 100.

As shown in FIG. 3, the single-core fiber 200 is an optical fiber having one core 202 (single-core fiber).

As shown in FIGS. 1 to 3, the connector assembly 1 includes a first ferrule 2, a second ferrule 3, a first optical connection component 4 (optical connection component), and a second optical connection component 5.

As shown in FIGS. 2 and 3, the first ferrule 2 holds an end portion of the multi-core fiber 100. In one or more embodiments, the number of the multi-core fibers 100 held by the first ferrule 2 is one.

One first fiber hole 21 and two first guide holes 22 are formed in the first ferrule 2. The first fiber hole 21 and the first guide hole 22 extend in the same direction. The first ferrule 2 has a first exposed surface 23 through which the first fiber hole 21 and the first guide hole 22 are opened.

Direction Definition

In one or more embodiments, a longitudinal direction of the first fiber hole 21 or the first guide hole 22 will be referred to as a front and rear direction Z. A direction in which the two first guide holes 22 are aligned will be referred to as a left and right direction X. The left and right direction X is orthogonal to the front and rear direction Z. A direction orthogonal to both the front and rear direction Z and the left and right direction X will be referred to as an up-down direction Y. In addition, the first exposed surface 23 side in the front and rear direction Z will be referred to as a front side (+Z), and a side opposite thereto will be referred to as a rear side (−Z). In addition, an upper side in the up-down direction Y is indicated by +Y, and a lower side on the opposite side is indicated by −Y.

The first fiber hole 21 penetrates the first ferrule 2 in the front and rear direction Z. The multi-core fiber 100 is inserted into the first fiber hole 21. An end surface 101 (hereinafter, referred to as an output end surface 101) of the multi-core fiber 100 inserted into the first fiber hole 21 is exposed outward from the first exposed surface 23. The output end surface 101 of the multi-core fiber 100 is an inclined end surface inclined with respect to a plane perpendicular to the front and rear direction Z (axial direction of the multi-core fiber 100). The first exposed surface 23 of the first ferrule 2 is inclined as in the output end surface 101, and forms the same flat surface together with the output end surface 101. The output end surface 101 is an inclined end surface. In this manner, reflected return light beams from the output end surface 101 to the multi-core fiber 100 itself can be reduced.

In addition, in one or more embodiments, the first exposed surface 23 of the first ferrule 2 and the output end surface 101 form the same flat surface. However, the output end surface 101 may be protruded or recessed in the front and rear direction Z with respect to the first exposed surface 23, and the first exposed surface 23 of the first ferrule 2 and the output end surface 101 may not form the same flat surface. In this case, a protruded or recessed size of the output end surface 101 with respect to the first exposed surface 23 may be appropriately adjusted depending on a distance from a first input end 41 of the first optical connection component 4 (to be described later), a spread angle of a light beam output from the output end surface 101, and an inclination angle with respect to the front and rear direction Z.

Figure 5:
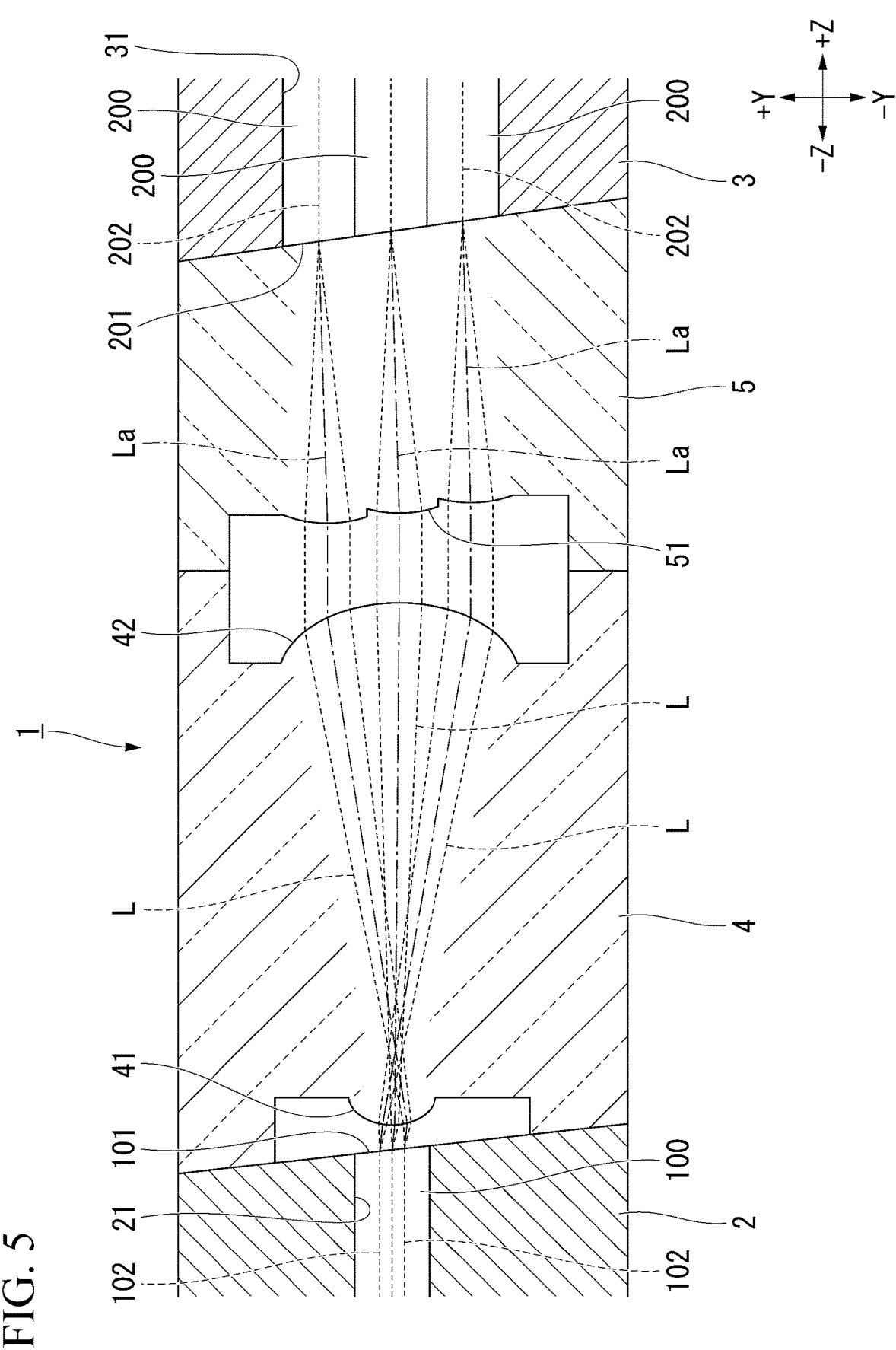
FIG. 5 is a diagram for describing an aspect of optical coupling between the multi-core fiber and a plurality of single-core fibers in the connector assembly in FIG. 3.

The output end surface 101 of the multi-core fiber 100 is an inclined end surface. Therefore, as shown in FIG. 5, according to the Snell's law, each of a plurality of light beams L (particularly, an optical axis La of the light beam L) output forward from the plurality of cores 102 of the multi-core fiber 100 is refracted on the output end surface 101 which is a medium interface, and propagates in a direction inclined with respect to the front and rear direction Z. In one or more embodiments, the output end surface 101 is inclined forward as the output end surface 101 is directed downward. Therefore, since a refractive index of silica glass generally used for an optical fiber is higher than a refractive index of air, the plurality of light beams L output from the output end surface 101 of the multi-core fiber 100 propagate to be inclined downward as the light beam L is directed forward.

The first guide hole 22 shown in FIG. 2 penetrates the first ferrule 2 in the front and rear direction Z as in the first fiber hole 21. A guide pin 6 is inserted into each of the first guide holes 22. The two first guide holes 22 are located on both sides of the first fiber hole 21 in the left and right direction X. The guide pin 6 is used for mutual alignment of the first ferrule 2, the second ferrule 3, the first optical connection component 4, and the second optical connection component 5.

As shown in FIGS. 2 and 3, the second ferrule 3 holds an end portion of the plurality of single-core fibers 200. The number of the single-core fibers 200 held by the second ferrule 3 corresponds to the number of the cores 102 of the multi-core fiber 100 held by the first ferrule 2. The number of the single-core fibers 200 in one or more embodiments is four.

A second fiber hole 31 and two second guide holes 32 are formed in the second ferrule 3. The second fiber hole 31 and the second guide hole 32 extend in the front and rear direction Z. The second ferrule 3 has a second exposed surface 33 through which the second fiber hole 31 and the second guide hole 32 are opened.

The second fiber hole 31 penetrates the second ferrule 3 in the front and rear direction Z. The single-core fiber 200 is inserted into the second fiber hole 31. In one or more embodiments, only one second fiber hole 31 is formed, and the plurality of single-core fibers 200 are inserted into the same second fiber hole 31. The plurality of second fiber holes 31 may be formed, and the plurality of single-core fibers 200 may be individually inserted into the plurality of second fiber holes 31.

End surfaces 201 (hereinafter, referred to as input end surfaces 201) of the plurality of single-core fibers 200 inserted into the second fiber holes 31 are exposed outward from the second exposed surface 33. The input end surface 201 of each of the single-core fibers 200 is an inclined end surface inclined with respect to a plane perpendicular to the axial direction (front and rear direction Z) of the single-core fiber 200. The second exposed surface 33 of the second ferrule 3 is inclined as in the input end surface 201, and forms the same flat surface together with the input end surfaces 201 of the plurality of single-core fibers 200. When a gap between the second exposed surface 33 and a second output end 52 of the second optical connection component 5 (to be described later) is extremely small from a viewpoint of the refractive index, the input end surface 201 may be slightly protruded or recessed in the front and rear direction Z with respect to the second exposed surface 33 of the second ferrule 3.

The input end surface 201 of each of the single-core fibers 200 is an inclined end surface. Therefore, as shown in FIG. 5, according to the Snell's law, the light beam L (particularly, the optical axis La of the light beam L) output rearward from the core 202 of each of the single-core fiber 200 is refracted on the input end surface 201 which is a medium interface, and propagates in a direction inclined with respect to the front and rear direction Z (axis of the single-core fiber 200). In one or more embodiments, the input end surface 201 is inclined forward as the input end surface 201 is directed downward. Therefore, the light beam L output from the input end surface 201 of the single-core fiber 200 propagate to be inclined downward or upward as the light beam L is directed rearward, depending on a refractive index ratio between front and rear media of the input end surface 201 and an inclination angle of the input end surface 201. In one or more embodiments, the light beam L propagates to be inclined downward.

The second guide hole 32 shown in FIG. 2 penetrates the second ferrule 3 in the front and rear direction Z as in the second fiber hole 31. The guide pin 6 is inserted into each of the second guide holes 32. The two second guide holes 32 are located on both sides of the second fiber hole 31 in the left and right direction X. Relative positions of the two second guide holes 32 correspond to relative positions of the two first guide holes 22.

As shown in FIGS. 2 and 3, the second ferrule 3 is arranged with respect to the first ferrule 2 such that the second exposed surface 33 faces the first exposed surface 23 in the front and rear direction Z. That is, the second ferrule 3 is arranged such that the second exposed surface 33 is directed rearward.

The first optical connection component 4 and the second optical connection component 5 are components for guiding the plurality of light beams L between the plurality of cores 102 of the multi-core fiber 100 and the cores 202 of the plurality of single-core fibers 200 corresponding thereto (refer to FIG. 5). Both the first optical connection component 4 and the second optical connection component 5 are formed of a light transmittable material without scattering the light beam. The first optical connection component 4 is arranged between the first exposed surface 23 of the first ferrule 2 and the second exposed surface 33 of the second ferrule 3. The second optical connection component 5 is arranged between the first optical connection component 4 and the second exposed surface 33 of the second ferrule 3.

The first optical connection component 4 has a first input end 41 and a first output end 42. The first optical connection component 4 is arranged such that the first input end 41 faces the output end surface 101 of the multi-core fiber 100 or the first exposed surface 23 of the first ferrule 2, and the first output end 42 faces the second optical connection component 5.

As shown in FIG. 5, the first input end 41 is configured such that the plurality of light beams L output from the output end surface 101 of the multi-core fiber 100 are separated from each other as the plurality of light beams L are directed to a front side (single-core fiber 200 side), and beam diameters of the plurality of light beams L are enlarged. For example, the beam diameter is an effective beam diameter at which light intensity of the light beam L is $1/e^2$ from a peak of a central portion. The first input end 41 of one or more embodiments is configured to include a convex lens formed to protrude to a rear side. The first input end 41 may be configured to include a prism, for example.

As shown in FIG. 3, a central axis (optical axis) 41C of the first input end 41 is parallel to the front and rear direction Z (axial direction of the multi-core fiber 100).

As shown in FIG. 5, the first output end 42 is configured such that the plurality of light beams L (particularly, the optical axis La of the light beam L) passing through the first input end 41 from the output end surface 101 of the multi-core fiber 100 and directed to the front side (single-core fiber 200 side) are parallel to the front and rear direction Z. In this manner, the plurality of light beams L output from the first output end 42 are parallel to each other. In addition, the first output end 42 converts the plurality of light beams L directed to the front side from the first input end 41 side into collimated light beams whose beam diameter is less changed even when the collimated light beams propagate forward. The first output end 42 is configured to include a convex lens formed to protrude to the front side.

In one or more embodiments, as shown in FIG. 3, an intersection (hereinafter, referred to as a "vertex 42T of the first output end 42") between the first output end 42 and a central axis (optical axis) 42C of the first output end 42 is located to deviate from the central axis 41C of the first input end 41 in a direction orthogonal to the front and rear direction Z. In FIG. 3, the central axis 42C of the first output end 42 is parallel to the front and rear direction Z as in the central axis 41C of the first input end 41. Therefore, the central axis 42C of the first output end 42 deviates from the central axis 41C of the first input end 41 in the direction orthogonal to the front and rear direction Z. In FIG. 3, the vertex 42T or the central axis 42C of the first output end 42 deviates from the central axis 41C of the first input end 41 in the up-down direction Y. However, depending on an inclination direction of the output end surface 101, the vertex 42T or the central axis 42C of the first output end 42 may deviate in the left and right direction X, for example.

A deviation amount Δd of the vertex 42T or the central axis 42C of the first output end 42 from the central axis 41C of the first input end 41 may be appropriately adjusted depending on, for example, an interval between the first input end 41 and the second output end 52 in the front and rear direction Z. The vertex 42T or the central axis 42C of the first output end 42 deviates from the central axis 41C of the first input end 41. Accordingly, the plurality of light beams L output forward from the first output end 42 are parallel to each other, and are parallel to the front and rear direction Z. In addition, the light beam output forward from the first output end 42 is the collimated light beam.

Hereinafter, the first optical connection component 4 of one or more embodiments will be described in more detail.

As shown in FIG. 3, the first optical connection component 4 has a first rear end surface 43 and a first front end surface 44. The first rear end surface 43 is an inclined surface which comes into surface contact with the first exposed surface 23 of the first ferrule 2. The first front end surface 44 is a surface which comes into surface contact with a second rear end surface 53 of the second optical connection component 5 (to be described later), and is orthogonal to the front and rear direction Z.

A first rear recess portion 45 that is recessed forward from the first rear end surface 43 directed rearward is formed in the first optical connection component 4. The first input end 41 formed to protrude to the rear side is provided on a bottom surface 45b of the first rear recess portion 45. The first input end 41 may be arranged inside the first rear recess portion 45, and may not protrude rearward from the first rear end surface 43. In this manner, even when the first rear end surface 43 is brought into surface contact with the first exposed surface 23 of the first ferrule 2, the first input end 41 can be prevented from coming into contact with the multi-core fiber 100 or the first ferrule 2.

A first front recess portion 46 that is recessed rearward from a first front end surface 44 directed forward is formed in the first optical connection component 4. The first output end 42 formed to protrude to the front side is provided on a bottom surface 46b of the first front recess portion 46. The first output end 42 is arranged inside the first front recess portion 46, and does not protrude forward from the first front recess portion 46. In this manner, even when the first front end surface 44 is brought into surface contact with the second rear end surface 53 of the second optical connection component 5, the first output end 42 can be prevented from coming into contact with the second optical connection component 5.

As shown in FIG. 2, two first through-holes 47 are formed in the first optical connection component 4. Each of the first through-holes 47 penetrates the first optical connection component 4 in the front and rear direction Z, and is open on the first rear end surface 43 and the first front end surface 44. The guide pin 6 is inserted into each of the first through-holes 47. Relative positions of the two first through-holes 47 correspond to relative positions of the two first guide holes 22.

The second optical connection component 5 is a component that collects each of the plurality of light beams L (refer to FIG. 5) output from the first output end 42 of the first optical connection component 4, and causes the plurality of light beams L to enter the plurality of single-core fibers 200. As shown in FIG. 3, the second optical connection component 5 has a second input end 51 and a second output end 52. The second optical connection component 5 is arranged such that the second input end 51 faces the first output end 42 of the first optical connection component 4, and the second output end 52 faces the input end surfaces 201 of the plurality of single-core fibers 200 or the second exposed surface 33 of the second ferrule 3.

As shown in FIG. 5, as the plurality of light beams L output from the first output end 42 are directed to the front side (single-core fiber 200 side), the second input end 51 is configured such that the beam diameters of the plurality of light beams L are reduced. In addition, the second input end 51 causes the plurality of light beams L (particularly, the optical axis La) output from the first output end 42 to be refractive, and causes the plurality of light beams L to propagate in a direction inclined with respect to the front and rear direction Z (axis of the single-core fiber 200). An inclination angle of the optical axis La of each of the light beams L directed forward from the second input end 51 corresponds to an inclination angle of the optical axis La of the light beam L output rearward from the core 202 of each of the single-core fibers 200.

The second input end 51 of one or more embodiments is configured to include a plurality of convex lenses protruding rearward. The number of the convex lenses configuring the second input end 51 corresponds to the number of the light beams L output from the first output end 42, that is, the number of the cores 102 of the multi-core fiber 100 and the number of the single-core fibers 200.

As shown in FIG. 3, the second rear end surface 53 directed that is rearward as in the second input end 51 is formed in the second optical connection component 5 of one or more embodiments. The second rear end surface 53 is a surface which comes into surface contact with the first front end surface 44 of the first optical connection component 4, and is orthogonal to the front and rear direction Z as in the first front end surface 44.

The second optical connection component 5 has a second rear recess portion 55 recessed forward from the second rear end surface 53. The second input end 51 formed to protrude to the rear side is provided on a bottom surface 55b of the second rear recess portion 55. The second input end 51 is arranged inside the second rear recess portion 55, and does not protrude rearward from the second rear end surface 53. In this manner, even when the second rear end surface 53 is brought into surface contact with the first front end surface 44 of the first optical connection component 4, the second input end 51 can be prevented from coming into contact with the first optical connection component 4.

The second output end 52 of the second optical connection component 5 is a flat surface which comes into surface contact with the input end surfaces 201 of the plurality of single-core fibers 200 or the second exposed surface 33 of the second ferrule 3. The second output end 52 is inclined with respect to a plane perpendicular to the front and rear direction Z as in the input end surface 201 or the second exposed surface 33.

The second output end 52 may be configured such that the light beams output from the second output end 52 enter the input end surfaces 201 of the plurality of single-core fibers 200. That is, the second output end 52 does not need to be a flat surface, and for example, the second output end 52 may have a recess portion as in the first front recess portion 46 of the first optical connection component 4.

As shown in FIG. 2, two second through-holes 57 are formed in the second optical connection component 5. The two through-holes penetrate the second optical connection component 5 in the front and rear direction Z, and are open on the second rear end surface 53 and the second output end 52. The guide pin 6 is inserted into each of the second through-holes 57. Relative positions of the two second through-holes 57 correspond to relative positions of the two first guide holes 22.

In the connector assembly 1 configured as described above, each of the two guide pins 6 is inserted into the first guide hole 22 of the first ferrule 2, the first through-hole 47 of the first optical connection component 4, the second through-hole 57 of the second optical connection component 5, and the second guide hole 32 of the second ferrule 3. In this manner, the first ferrule 2, the first optical connection component 4, the second optical connection component 5, and the second ferrule 3 are positioned in the left and right direction X and the up-down direction Y. In addition, the first ferrule 2, the first optical connection component 4, the second optical connection component 5, and the second ferrule 3 are also positioned in a rotational direction in which the front and rear direction Z is set as the axis.

In addition, in the connector assembly 1, as shown in FIG. 1, the first ferrule 2, the first optical connection component 4, the second optical connection component 5, and the second ferrule 3 are aligned in order from the front side to the rear side without any gap. In this manner, the first ferrule 2, the first optical connection component 4, the second optical connection component 5, and the second ferrule 3 are positioned in the front and rear direction Z.

In this state, as shown in FIG. 5, when the plurality of light beams L output from the plurality of cores 102 of the multi-core fiber 100 enter the first optical connection component 4 from the first input end 41, the plurality of light beams L are separated from each other as the plurality of light beams L are directed toward the first output end 42. In addition, the beam diameter of each of the light beams L is enlarged. In a state where the plurality of light beams L output from the first output end 42 of the first optical connection component 4 are parallel to each other and are parallel to the front and rear direction Z, the plurality of light beams L propagate toward the second input end 51 of the second optical connection component 5. The beam diameter of each of the light beams directed toward the second input end 51 of the second optical connection component 5 from the first output end 42 of the first optical connection component 4 is larger than the beam diameter of each of the light beams entering the first input end 41 from the multi-core fiber 100.

When entering the second optical connection component 5 from the second input end 51, each of the plurality of light beams L output from the first output end 42 of the first optical connection component 4 propagates toward the plurality of single-core fibers 200. In addition, each of the plurality of light beams L is collected toward the plurality of single-core fibers 200. That is, the beam diameter of each of the light beams L is reduced to coincide with mode field diameters of the plurality of single-core fibers 200.

In the connector assembly 1 of one or more embodiments, as described above, each of the plurality of light beams L output from the plurality of cores 102 of the multi-core fiber 100 can be guided to the plurality of single-core fibers 200. In addition, in the connector assembly 1 of one or more embodiments, the plurality of light beams L output from the plurality of single-core fibers 200 can also be guided to each of the cores 102 of the multi-core fiber 100.

As described above, according to the first optical connection component 4 and the connector assembly 1 of the first example, in a state where each of the plurality of light beams L output from the first output end 42 is parallel to the front and rear direction Z, each of the plurality of light beams L propagates toward the second input end 51 of the second optical connection component 5. In addition, the plurality of light beams L output from the first output end 42 are the collimated light beams. Therefore, even when an interval between the first optical connection component 4 (first output end 42) and the second optical connection component 5 (second input end 51) in the front and rear direction Z is not accurately determined, the plurality of light beams L can be guided to the second input end 51 from the first output end 42. For example, in the front and rear direction Z, even when accuracy is low in a length from the first front end surface 44 to the bottom surface 46b of the first front recess portion 46 or a length from the second rear end surface 53 to the bottom surface 55b of the second rear recess portion 55 (that is, machining accuracy of the first and second optical connection components 4 and 5 is low), the plurality of light beams L can be guided to the second input end 51 from the first output end 42.

Furthermore, according to the first optical connection component 4 and the connector assembly 1 of the first example, the beam diameter of each of the light beams L output from the first output end 42 is larger than the beam diameter of each of the light beams L entering the first input end 41. Therefore, even when the relative positions of the first optical connection component 4 and the second optical connection component 5 in the directions (left and right direction X and up-down direction Y) orthogonal to the front and rear direction Z are not accurately determined, the plurality of light beams L can be guided to the second input end 51 from the first output end 42. For example, even when the guide pin 6 is slightly loose inside the first and second guide holes 22 and 32 and the first and second through-holes 47 and 57 (that is, the machining accuracy of the guide pin 6, the first and second guide holes 22 and 32, and the first and second through-holes 47 and 57 is low), the plurality of light beams L can be guided to the second input end 51 from the first output end 42.

According to the above-described configurations, even when accuracy in relative positioning between the first optical connection component 4 and the second optical connection component 5 is low, the multi-core fiber 100 and the plurality of single-core fibers 200 can be easily and optically coupled.

In addition, in the first optical connection component 4 and the connector assembly 1 of the first example, the vertex 42T of the first output end 42 is located to deviate from the central axis 41C of the first input end 41 in the direction orthogonal to the front and rear direction Z. In this manner, even when the plurality of light beams L output from the output end surface 101 of the multi-core fiber 100 enter the first input end 41 of the first optical connection component 4 after propagating in a direction inclined with respect to the front and rear direction Z, the plurality of light beams L output from the first output end 42 of the first optical connection component 4 can be parallel to each other, and can be parallel to the front and rear direction Z. In addition, each of the light beams output from the first output end 42 can be the collimated light beam.

Second Example

Next, a connector assembly according to a second example of one or more embodiments will be described mainly with reference to FIGS. 6 and 7. In the following description, the same reference numerals will be assigned to configurations common to those already described, and repeated description will be omitted.

Figure 6:
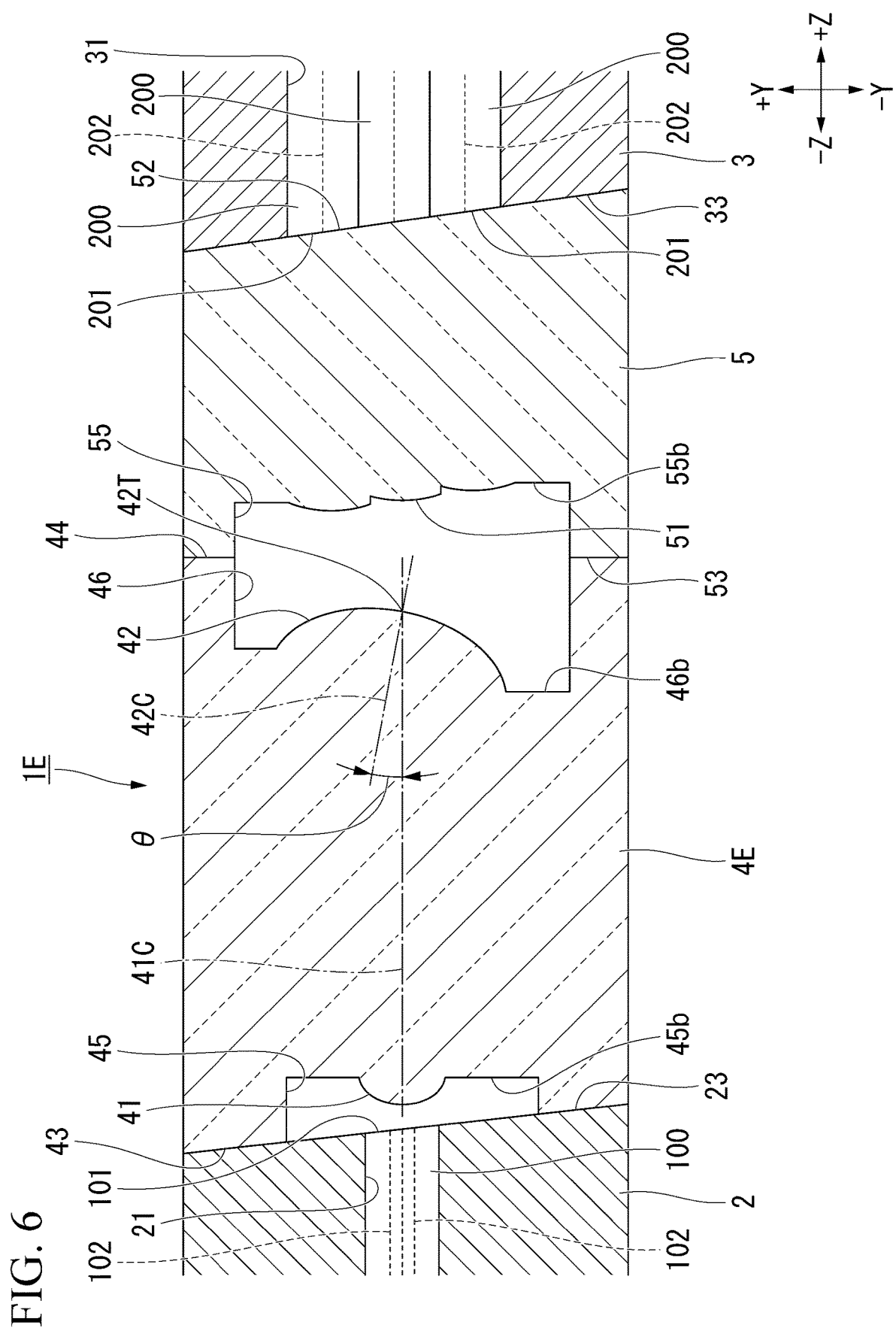
FIG. 6 is a sectional view of a connector assembly according to one or more embodiments.
Figure 7:
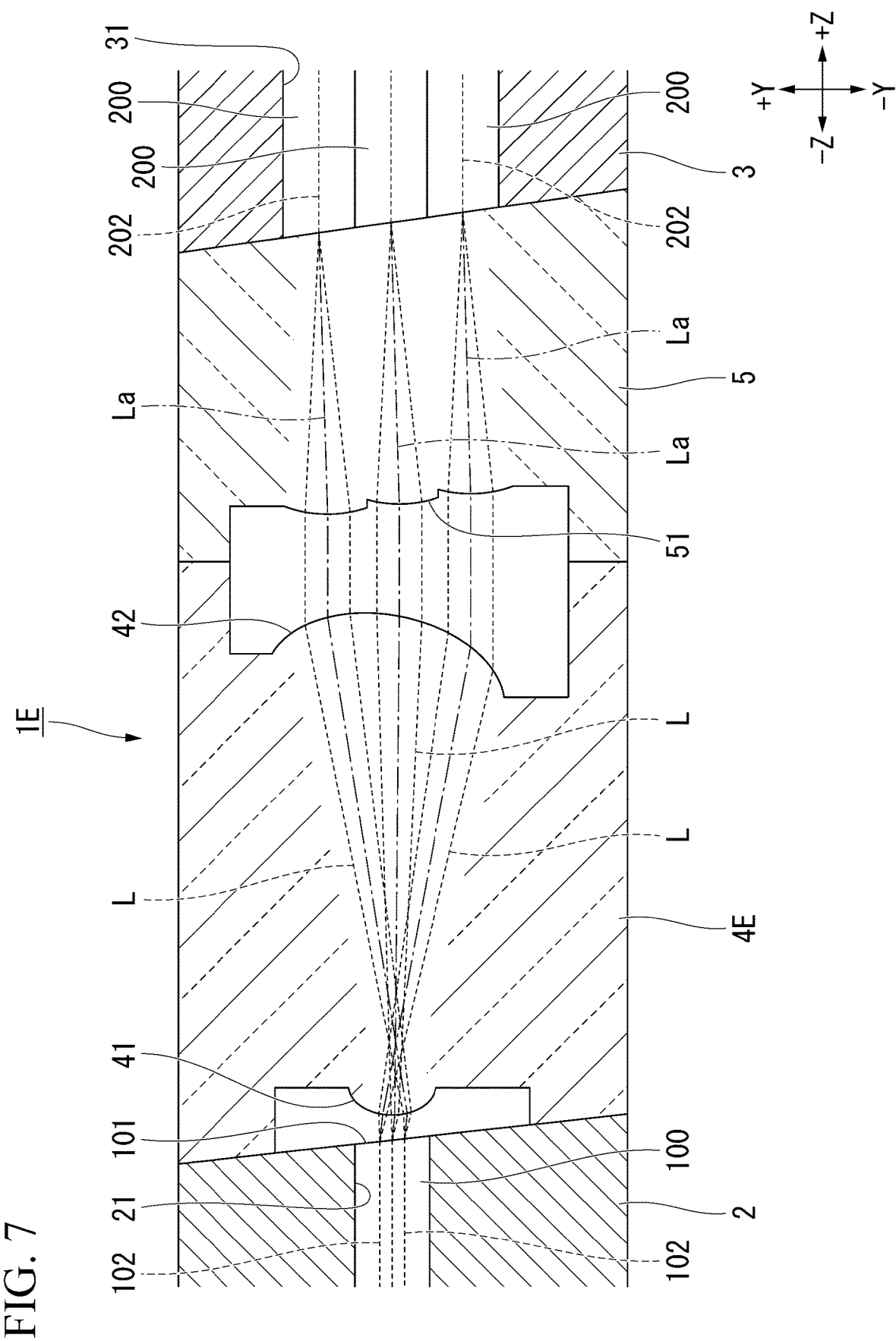
FIG. 7 is a diagram for describing an aspect of optical coupling between a multi-core fiber and a plurality of single-core fibers in the connector assembly in FIG. 6.

As shown in FIGS. 6 and 7, as in the first example, a connector assembly 1E according to the second example includes a first optical connection component 4E having a first input end 41 and a first output end 42.

As in the first example, the first output end 42 is configured such that the plurality of light beams L (particularly, the optical axis La) directed to the front side after passing through the first input end 41 from the output end surface 101 of the multi-core fiber 100 are parallel to the front and rear direction Z. In addition, the first output end 42 converts the plurality of light beams L directed to the front side from the first input end 41 side into the collimated light beams. Furthermore, the first output end 42 is configured to include a convex lens formed to protrude to the front side.

As shown in FIG. 6, the central axis (optical axis) 41C of the first input end 41 is parallel to the front and rear direction Z as in the first example. However, in the second example, the central axis (optical axis) 42C of the first output end 42 is inclined with respect to the central axis 41C of the first input end 41 around the vertex 42T of the first output end 42. In FIG. 6, the vertex 42T of the first output end 42 is located on the central axis 41C of the first input end 41.

An inclination angle θ of the central axis 42C of the first output end 42 with respect to the central axis 41C of the first input end 41 may be appropriately adjusted depending on an interval between the first input end 41 and the second output end 52 in the front and rear direction Z. The central axis 42C of the first output end 42 is inclined with respect to the central axis 41C of the first input end 41. Accordingly, the plurality of light beams L output forward from the first output end 42 are parallel to each other, and are parallel to the front and rear direction Z. In addition, the light beam output forward from the first output end 42 is the collimated light beam.

In the connector assembly 1E of the second example, as in the first example, each of the plurality of light beams L output from the plurality of cores 102 of the multi-core fiber 100 can be guided to the plurality of single-core fibers 200. In addition, in the connector assembly 1E of the second example, the plurality of light beams L output from the plurality of single-core fibers 200 can be guided to each of the cores 102 of the multi-core fiber 100.

According to the second example described above, advantageous effects the same as those of the first example are achieved.

In addition, in the first optical connection component 4E and the connector assembly 1E of the second example, the central axis 42C of the first output end 42 is inclined with respect to the central axis 41C of the first input end 41. In this manner, even when the plurality of light beams L output from the output end surface 101 of the multi-core fiber 100 enter the first input end 41 of the first optical connection component 4E after propagating in a direction inclined with respect to the front and rear direction Z, the plurality of light beams L output from the first output end 42 of the first optical connection component 4E can be parallel to each other, and can be parallel to the front and rear direction Z. In addition, each of the light beams output from the first output end 42 can be the collimated light beam.

Hitherto, although details of the present invention have been described above, the present invention is not limited to the above-described embodiments, and various modifications can be added within the scope not departing from the concept of the present invention.

In the connector assembly of one or more embodiments, for example, as in the first example, the vertex 42T of the first output end 42 may be located to deviate from the central axis 41C of the first input end 41 in the direction orthogonal to the front and rear direction Z, and as in the second example, the central axis 42C of the first output end 42 may be inclined with respect to the axis of the first input end 41. According to this configuration, advantageous effects the same as those of the above-described first and second examples can also be achieved.

Figure 8:
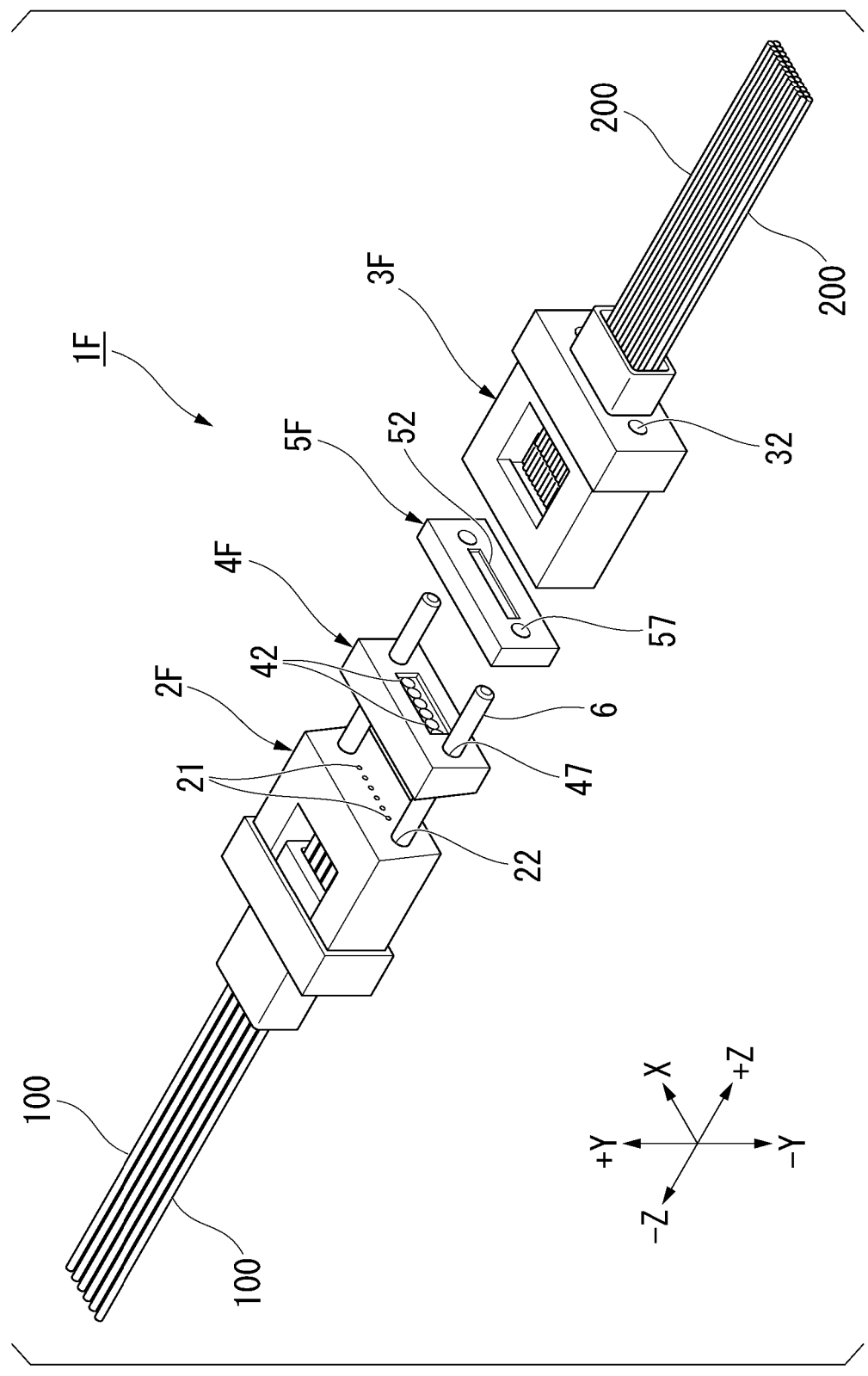
FIG. 8 is an exploded perspective view of a connector assembly according to one or more embodiments.

In the connector assembly of one or more embodiments, for example, as shown in FIG. 8, a first ferrule 2F may hold end portions of the plurality of (for example, N-number) multi-core fibers 100. In this case, the number of the single-core fibers 200 held by the second ferrule 3F may be a number (that is, N×M) obtained by multiplying the number (for example, N-number) of multi-core fibers 100 held by the first ferrule 2F and the number (for example, M-number) of the cores in each of the multi-core fibers 100. In addition, the first optical connection component 4F may have the same number of the first input ends 41 (refer to FIG. 3) and the same number of the second input ends 51 as the number of the multi-core fibers 100 (N-number). Furthermore, the second optical connection component 5F may have the same number of the second input ends 51 (refer to FIG. 3) as the number (N-number) of the multi-core fibers 100. In a connector assembly 1F configured in this way, the plurality of multi-core fibers 100 and the number of the single-core fibers 200 corresponding to a total number of the cores of the plurality of multi-core fibers 100 can be collectively and optically connected.

Figure 9:
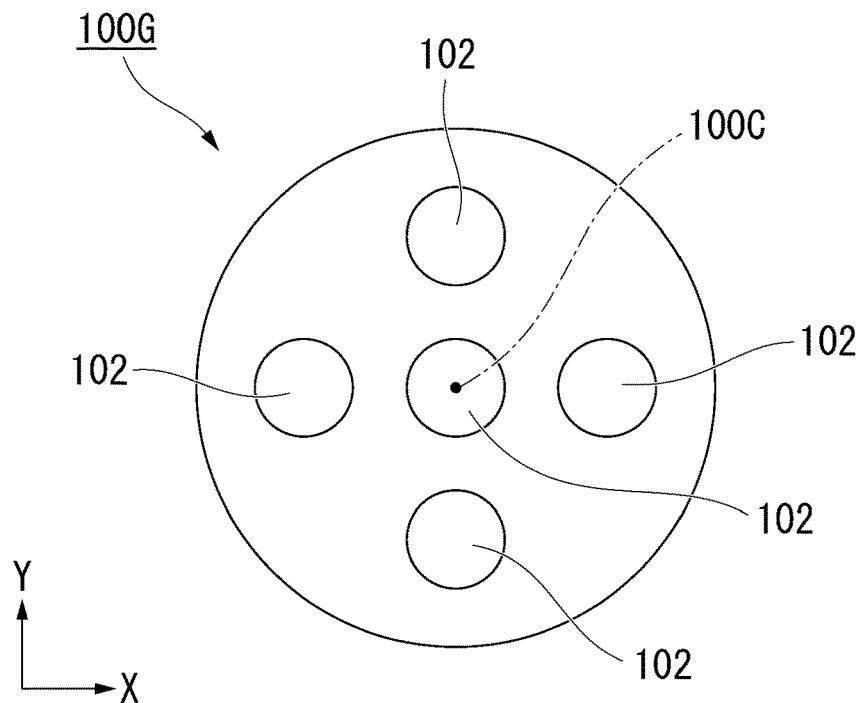
FIG. 9 is a diagram schematically showing a cross section of a first modification example of the multi-core fiber.
Figure 10:
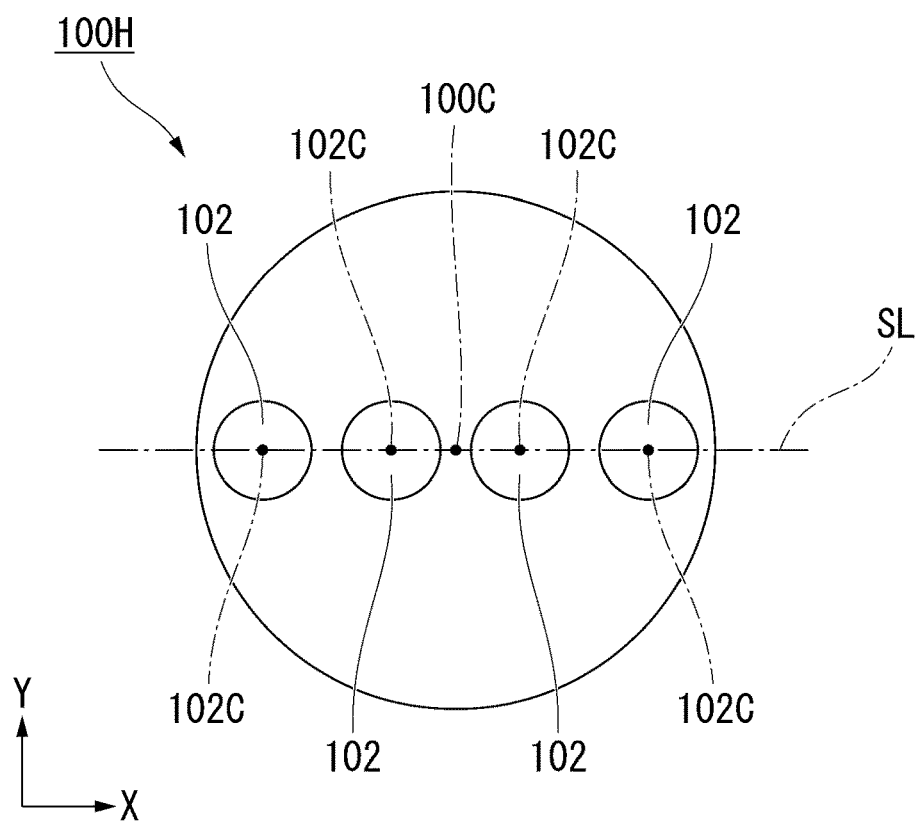
FIG. 10 is a diagram schematically showing a cross section of a second modification example of the multi-core fiber.

The connector assembly of one or more embodiments may be used for multi-core fibers 100G and 100H shown in FIGS. 9 and 10.

The multi-core fiber 100G shown in FIG. 9 has five cores 102. As in the multi-core fiber 100 shown in FIG. 4, four cores 102 out of the five cores 102 are aligned at an equal interval in the circumferential direction around an axis 100C of the multi-core fiber 100G. The remaining one core 102 is located such that the center coincides with the axis 100C of the multi-core fiber 100G.

The multi-core fiber 100H shown in FIG. 10 has four cores 102. The four cores 102 are aligned in a line in a direction orthogonal to the axis 100C of the multi-core fiber 100H (left and right direction X in FIG. 10). In addition, the axis 100C of the multi-core fiber 100H and centers 102C of the four cores 102 are located on the same straight line SL extending in an array direction of the four cores 102.

In both the multi-core fibers 100G and 100H shown in FIGS. 9 and 10, as in the multi-core fiber 100 of the above-described embodiments shown in FIG. 4, the plurality of cores 102 are arranged at rotationally symmetrical positions around the axes 100C of the multi-core fibers 100G and 100H.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST 1, 1E, 1F: Connector assembly
2, 2F: First ferrule
23: First exposed surface 3, 3F: Second ferrule
33: Second exposed surface
4, 4E, 4F: First optical connection component (optical connection component)
41: First input end
41C: Central axis of first input end 41
42: First output end
42C: Central axis of first output end 42
42T: Vertex (intersection)
5, 5F: Second optical connection component
100, 100G, 100H: Multi-core fiber
101: Output end surface
200: Single-core fiber
201: Input end surface
Z: Front and rear direction (axial direction)

What is claimed is:

1. An optical connection component comprising:
   an input end that separates each of light beams output from an output end surface of a multi-core fiber toward single-core fibers, and enlarges each beam diameter of the light beams; and
   an output end that allows the light beams from the input end to be parallel to an axial direction of the multi-core fiber, wherein
   the optical connection component guides the light beams output from the output end surface, inclined with respect to a plane perpendicular to the axial direction, to the single-core fibers, such that the light beams output from the output end surface propagate in a direction inclined with respect to the axial direction.

2. The optical connection component according to claim 1, wherein
   a central axis of the input end is parallel to the axial direction, and
   an intersection between the output end and a central axis of the output end deviates from the central axis of the input end in a direction orthogonal to the axial direction.

3. The optical connection component according to claim 1, wherein
   a central axis of the input end is parallel to the axial direction, and
   a central axis of the output end is inclined with respect to the central axis of the input end around an intersection between the output end and the central axis of the output end.

4. A connector assembly comprising:
   a first ferrule that holds an end portion of a multi-core fiber and has a first exposed surface through which an output end surface of the multi-core fiber, inclined with respect to a plane perpendicular to an axial direction of the multi-core fiber, is exposed;
   a second ferrule that holds end portions of single-core fibers and has a second exposed surface through which each input end surface of the single-core fibers, inclined with respect to a plane perpendicular to an axial direction of the single-core fibers, is exposed;
   the optical connection component according to claim 1 disposed between the first exposed surface and the second exposed surface; and
   an additional optical connection component disposed between the optical connection component and the second exposed surface, wherein
   the input end of the optical connection component faces the first exposed surface, and
   the additional optical connection component collects each of the light beams output from the output end of the optical connection component, and causes the light beams to enter the single-core fibers.

5. The optical connection component according to claim 2, wherein the central axis of the output end is inclined with respect to the central axis of the input end around the intersection.

6. The optical connection component according to claim 1, wherein the input end includes a convex lens protruding toward the multi-core fiber.

7. The optical connection component according to claim 1, wherein the output end includes a convex lens protruding toward the single-core fibers.

* * * * *